(12) United States Patent
Shibayama

(10) Patent No.: US 6,816,333 B2
(45) Date of Patent: Nov. 9, 2004

(54) ELECTRONIC APPARATUS WITH AN APPARATUS FOR PROTECTING A MOVABLE SECTION AND METHOD OF PROTECTING THE MOVABLE SECTION OF THE ELECTRONIC APPARATUS

(75) Inventor: Tomonori Shibayama, Gunma (JP)

(73) Assignee: NEC Corporation, Tokyo (JP)

( * ) Notice: Subject to any disclaimer, the term of this patent is extended or adjusted under 35 U.S.C. 154(b) by 436 days.

(21) Appl. No.: 09/991,717

(22) Filed: Nov. 26, 2001

(65) Prior Publication Data

US 2002/0063988 A1 May 30, 2002

(30) Foreign Application Priority Data

Nov. 27, 2000 (JP) ........................................ 2000-360143

(51) Int. Cl.[7] .............................................. G11B 21/02
(52) U.S. Cl. ........................................... 360/75; 360/69
(58) Field of Search ...................... 360/75, 137, 97.01, 360/69, 60; 361/380, 683, 169, 685; 248/694

(56) References Cited

U.S. PATENT DOCUMENTS

| | | | | |
|---|---|---|---|---|
| 4,669,053 A | * | 5/1987 | Krenz ......................... | 361/680 |
| 4,832,419 A | * | 5/1989 | Mitchell et al. ............. | 361/681 |
| 5,021,922 A | * | 6/1991 | Davis et al. ................. | 361/680 |
| 5,247,285 A | * | 9/1993 | Yokota et al. ............... | 361/680 |
| 5,327,308 A | * | 7/1994 | Hanson ..................... | 360/97.01 |
| 5,764,480 A | * | 6/1998 | Crump et al. ................ | 361/685 |
| 5,956,194 A | * | 9/1999 | Ohmi et al. ................... | 360/60 |
| 6,188,569 B1 | * | 2/2001 | Minemoto et al. .......... | 361/683 |
| 6,216,999 B1 | * | 4/2001 | Olson et al. ................. | 248/694 |
| 6,256,193 B1 | * | 7/2001 | Janik et al. .................. | 361/683 |
| 6,549,416 B2 | * | 4/2003 | Sterner et al. .............. | 361/727 |
| 6,680,843 B2 | * | 1/2004 | Farrow et al. .............. | 361/681 |

FOREIGN PATENT DOCUMENTS

| | | |
|---|---|---|
| JP | 6-275002 | 9/1994 |
| JP | 7-130115 | 5/1995 |
| JP | 8-221886 | 8/1996 |
| JP | 2629548 | 4/1997 |
| JP | 10-232736 | 9/1998 |
| JP | 9-16284 | 1/1999 |
| JP | 11-345041 | 12/1999 |

* cited by examiner

*Primary Examiner*—David Hudspeth
*Assistant Examiner*—K. Wong
(74) *Attorney, Agent, or Firm*—Whitham, Curtis & Christofferson, P.C.

(57) ABSTRACT

An electronic apparatus includes a base, a main body and a lock mechanism. A main body is rotatably supported on the base and having a display unit. A lock mechanism prevents the main body from rotating with respect to the base. The main body includes the display unit and a magnetic disk drive. The magnetic disk drive includes a magnetic head and a safety unit. The magnetic head accesses a recording medium. A safety unit moves the magnetic head to a save position where the magnetic head is safe in the magnetic disk drive when the lock mechanism is unlocked. The safety unit move the magnetic head to start a seeking operation over the recording medium when the lock mechanism is locked.

16 Claims, 5 Drawing Sheets

ELECTRONIC APPARATUS WITH AN APPARATUS FOR PROTECTING A MOVABLE SECTION AND METHOD OF PROTECTING THE MOVABLE SECTION OF THE ELECTRONIC APPARATUS

BACKGROUND OF THE INVENTION

1. Field of the Invention

The present invention relates to an electronic apparatus with an apparatus for protecting a movable section and a method of protecting the movable section of the electronic apparatus. More particularly, the invention relates to electronic apparatus with an apparatus for protecting a movable section, such as a magnetic recording unit, which is incorporated in a movable thin main body.

2. Description of the Related Art

In magnetic disk drives, a magnetic head moves over a magnetic disk rotating at high speed, without contacting the disk, to record data on and read data from the magnetic disk. While operating, the magnetic head may contact the magnetic disk when it is accelerated or receives an external force such as an impact. If this happens, the magnetic disk is damaged. Such damage develops to the periphery of the disk due to the high-speed rotation of the disk, making it impossible to use the disk normally thereafter in some cases.

Computers including an LCD (Liquid Crystal Display) unit each are known. The user can turn the LCD unit to the left and the right and up and down so that he or she can see the LCD screen well. A movable section that is formed integral with the LCD unit may incorporate a magnetic disk drive. In this case the magnetic disk provided in the disk drive receives such an impact as described above, when the LCD unit is moved while the magnetic disk drive is being accessed. There is the risk of destroying the data recorded on the magnetic disk. In view of this risk, it is difficult to arrange the magnetic disk drive in the back of the LCD unit. Even if the disk drive is arranged in the movable section integral with the LCD unit, the data on the disk may be destroyed when the movable section of the computer is moved while magnetic disk drive (HDD) is being accessed. The existing technical level cannot help but provide computers that have a movable section each, which can be moved only while no power is being supplied to the computer main body. The user of the computer may operate the LCD unit, by mistake, while the HDD is being accessed, possibly damaging the HDD. To obviate such a damage, the HDD cannot be provided in the LCD unit. This restricts the design layout of the computer.

It is desired that the design layout of computers should not be limited. It is particularly so desired in the case of any computer that includes a movable section and an HDD incorporated in the movable section.

Japanese Laid Open Patent Application (JP-A-Heisei 9-16284) discloses a notebook-type personal computer having an LCD unit that can be rotated. The notebook-type personal computer includes a main body having a keyboard, and the LCD unit that displays the image represented by an image signal supplied from the main body. The personal computer further includes means configured to rotate the LCD unit in horizontal direction and an electrode section configured to keep the LCD unit electrically connected to the main body whenever the LCD unit is rotated.

The LCD unit of this notebook-type personal computer can be rotated though any desired angle to display images to the user of the computer. The main body of the computer need not be moved to enable the user to see images in the best possible manner.

Japanese Patent Publication No. 2629548 discloses a protection mechanism for protecting a magnetic disk drive. The protection mechanism is designed for use in mobile terminals. The protection mechanism includes a plurality of pressure sensors and save control means. The pressure sensors are spaced apart from one another, below the magnetic disk drive provided in a mobile terminal. They cooperate to detect a displacement of the magnetic disk drive in the form of a change in the weight (pressure) of the magnetic disk, by virtue of the gyromagnetic effect of the rotating recording medium. The save control means receives detection signals output from the pressure sensors and determines, from the detection signals, that the magnetic disk has inclined. Upon determining the inclining of the disk, the save control means moves the magnetic head to a save area.

The protection mechanism detects that the user has, by mistake, inclined or dropped the mobile terminal while the mobile terminal is operating. The mechanism immediately moves the magnetic head to the save area, thus preventing damages to the magnetic disk drive.

Japanese Laid Open Patent Application (JP-A-Heisei 10-232726 discloses a desktop computer. The desktop computer includes a display, a main body and an input unit. The display is a thin one provided on the upper surface of the main body and can be inclined and moved in horizontal direction.

The desktop computer is small and light. The user can see the data displayed on the screen, not only from the front, but also from either side or the back.

Further, Japanese Laid Open Patent Application (JP-A-Heisei 7-130115) discloses a data-processing apparatus. The data-processing apparatus is a portable one, which includes detecting means and protection means. The detecting means detects that the acceleration of the main body of the apparatus has already exceeded a predetermined value. When the detecting means detects that the acceleration has exceeded the predetermined value, the protection means is activated to protect the main body of the data-processing apparatus.

The publication describes that, in the data-processing apparatus, the hard disk drive and the like are protected and the contents of the volatile memory can be saved if and when the user applies, by error, an abrupt vibration or an excessive impact to the mobile, thin data-processing apparatus.

Japanese Laid Open Patent Application (JP-A-Heisei 6-275002) discloses a protection device for use in hard disk drives. The protection device is designed for hard disk drives, in which a hard disk, i.e., a magnetic recording disk, is rotated and a magnetic head is moved in the radial direction of the disk to record data on, and reproduce data from, the magnetic disk. The protection device includes at least a detector and protection control means. The detector detects an external force, such as vibration or impact that is applied in the axis of the hard disk. The protection control means causes the magnetic head to stop outputting or receiving signals, in response to a signal the detector has generated. Also does the protection control means move the magnetic head from a recording/reproducing region on the hard disk.

As described in the publication, the protection device for protecting the hard disk drive is mounted in a small apparatus such as an electronic still camera and can prevent a head clash that may otherwise result from vibration or an external force.

Japanese Laid Open Patent Application (JP-A-Heisei 8-221886) discloses a data-recording apparatus. The apparatus disclosed in this publication includes a head section, a main body, a speed-detecting section, and head-withdrawing means. The head section can record and reproduce data on and from a recording medium. The main body incorporates the head section. The speed-detecting section detects the speed at which the main body moves. The head-withdrawing means moves the head section to a save area remote from the recording area of the recording medium, if the speed detected by the speed-detecting section exceeds a reference speed Vs.

As described in the publication, any recording region of the recording medium would not be damaged in the data-recording apparatus, even if the data-recording apparatus received such a great impact as it may get when it is dropped. Data can therefore be recorded as is desired.

Japanese Laid Open Patent Application (JP-A-Heisei 11-345041) discloses a notebook-type personal computer. This notebook-type personal computer includes a main body, a display unit and a keyboard. The main body incorporates CPU and peripheral devices. The display unit can be folded onto the main body. The keyboard is removably connected to the main body by a magnet.

The display unit of this notebook-type personal computer can be arranged so that the user may well see the data displayed. The keyboard of the notebook-type personal computer can be positioned so that the user may operate it well.

SUMMARY OF THE INVENTION

Therefore, an object of the present invention is to provide an electronic apparatus with an apparatus for protecting a movable section, which is not limited by the design layout of the electronic apparatus that includes an HDD incorporated in the movable section.

Another object of the present invention is to provide an electronic apparatus with an apparatus for protecting a movable section, which is compact and hard to receive damage.

Still another object of the present invention is to provide an electronic apparatus with an apparatus for protecting a movable section, of which users can move a display unit without giving any damage.

Yet still another object of the present invention is to provide a method of protecting the movable section of the electronic apparatus, which is for the electronic apparatus that includes an HDD incorporated in the movable section.

In order to achieve an aspect of the present invention, the present invention provides an electronic apparatus including: a base; a main body rotatably supported on the base; and a lock mechanism which prevents the main body from rotating with respect to the base, wherein the main body includes: a magnetic disk drive, wherein the magnetic disk drive includes: a magnetic head which accesses a recording medium; and a safety unit that moves the magnetic head to a save position where the magnetic head is safe in the magnetic disk drive, when the lock mechanism is unlocked.

In the electronic apparatus according to the present invention, the safety unit may move the magnetic head to start a seeking operation over the recording medium, when the lock mechanism is locked.

In the electronic apparatus according to the present invention, wherein the main body may further include a display unit.

In the electronic apparatus according to the present invention, the lock mechanism may include: a control unit which supplies a first control signal showing that the lock mechanism is unlocked to the safety unit, wherein the safety unit may supplies a first safety signal to move the magnetic head to the save position.

In the electronic apparatus according to the present invention, wherein the control unit may supply a second control signal showing that the lock mechanism is locked to the safety unit, and the safety unit may supply a second safety signal to move the magnetic head to start a seeking operation over the recording medium.

In the electronic apparatus according to the present invention, the lock mechanism may be manually operable.

In the electronic apparatus according to the present invention, the lock mechanism may further include: a first engagement section coupled to the main body; and a second engagement section coupled to the base, wherein the base may include: a switch that is manually operable wherein the switch outputs a first unlock signal to the safety unit to move the magnetic head to the save position, and outputs a second unlock signal to unlock the first engagement section or the second engagement section from the main body or the base, when the lock mechanism is unlocked.

In the electronic apparatus according to the present invention, the switch may output a first lock signal to the safety unit to move the magnetic head to start a seeking operation over the recording medium, and may output a second lock signal to lock the first engagement section or the second engagement section to the main body or the base, when the lock mechanism is locked.

In the electronic apparatus according to the present invention, the first and second lock signals may be off-signals.

In order to achieve another aspect of the present invention, the present invention provides a method of protecting a movable section, including the steps of: (a) detecting whether or not a main body is unlocked from a base of an electronic apparatus which includes: the base; and the main body movable with respect to the base, wherein the main body includes: a display unit; and a magnetic disk drive, wherein the magnetic disk drive includes: a magnetic head; and a recording medium; (b) suspending a seeking operation of the magnetic head over the recording medium, when the main body is unlocked from the base; and (c) moving the magnetic head to a save position where the magnetic head is safe in the magnetic disk drive.

In the method of protecting a movable section according to the present invention, the (a) detecting step includes the steps of: (d) generating automatically a first control signal when the main body is unlocked from the base; and (e) sending the first control signal to the magnetic disk drive, wherein the (b) suspending step suspends the seeking operation based on the first control signal.

In the method of protecting a movable section according to the present invention, the method further includes the steps of: (f) detecting whether or not the magnetic head lies in the save position, when the main body is locked to the base; (g) moving the magnetic head over the recording medium when the magnetic head lies in the save position; and (h) starting a seeking operation of the magnetic head.

In the method of protecting a movable section according to the present invention, the (f) detecting step includes the steps of: (i) generating automatically a second control signal when the main body is locked to the base; and (j) sending the second control signal to the magnetic disk drive, wherein the (g) moving step moves the magnetic head over the recording medium based on the second control signal.

In the method of protecting a movable section according to the present invention, the (a) detecting step includes the steps of: (k) generating automatically an unlock signal when the main body is unlocked from the base by turning on a switch; and (l) sending the unlock signal to the magnetic disk drive, wherein the (b) suspending step suspends the seeking operation based on the unlock signal, and the base includes the switch.

In the method of protecting a movable section according to the present invention, the (f) detecting step includes the steps of: (m) generating automatically a unlock signal when the main body is locked to the base by turning off the switch; and (n) sending the unlock signal to the magnetic disk drive, wherein the (g) moving step moves the magnetic head over the recording medium based on the unlock signal.

In the method of protecting a movable section according to the present invention, the (g) moving step includes the step of: (o) letting a predetermined time elapse after the main body is locked to the base.

DESCRIPTION OF THE PREFERRED EMBODIMENTS

Embodiments of the present invention will be described, with reference to the accompanying drawings.

Figure 1:
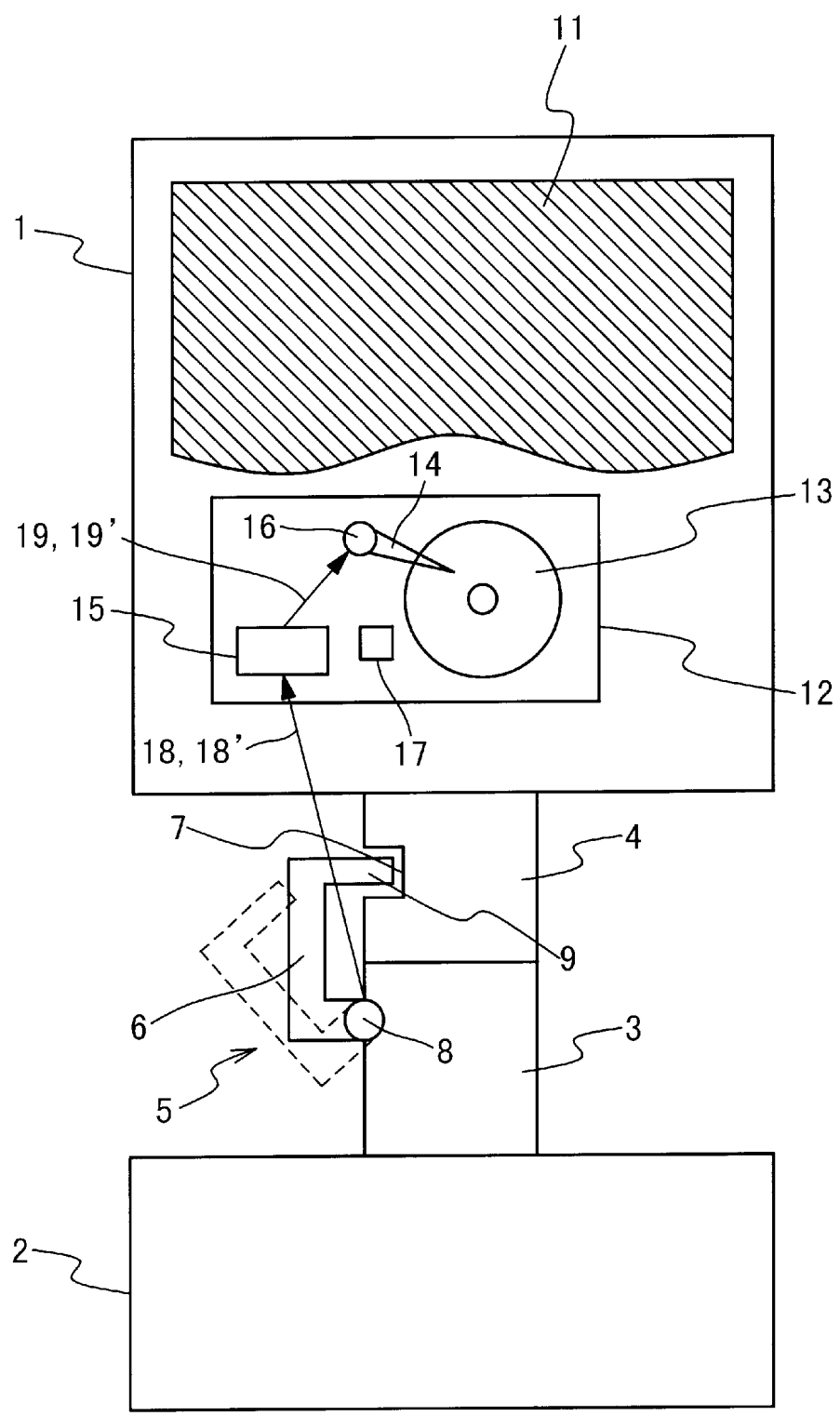
FIG. 1 is a sectional view of an electronic apparatus incorporating a protection apparatus according to a first embodiment of the present invention, which is configured to protect a movable section of the electronic apparatus.

An electronic apparatus of the first embodiment is a desktop personal computer illustrated in FIG. 1 and includes an LCD (Liquid Crystal Display). As FIG. 1 shows, the desktop personal computer includes a main body 1 and a base 2. The main body 1 is movably supported on the base 2 by a support mechanism. The support mechanism includes a base-side shaft 3 and a body-side shaft 4. The base-side shaft 3 is secured to the base 2 and can rotate. The body-side shaft 4 is secured to the main body 1. The body side shaft 4 is supported on the base-side shaft 3 and can rotate. A lock mechanism 5 is interposed between the base-side shaft 3 and the body-side shaft 4.

Figure 2:
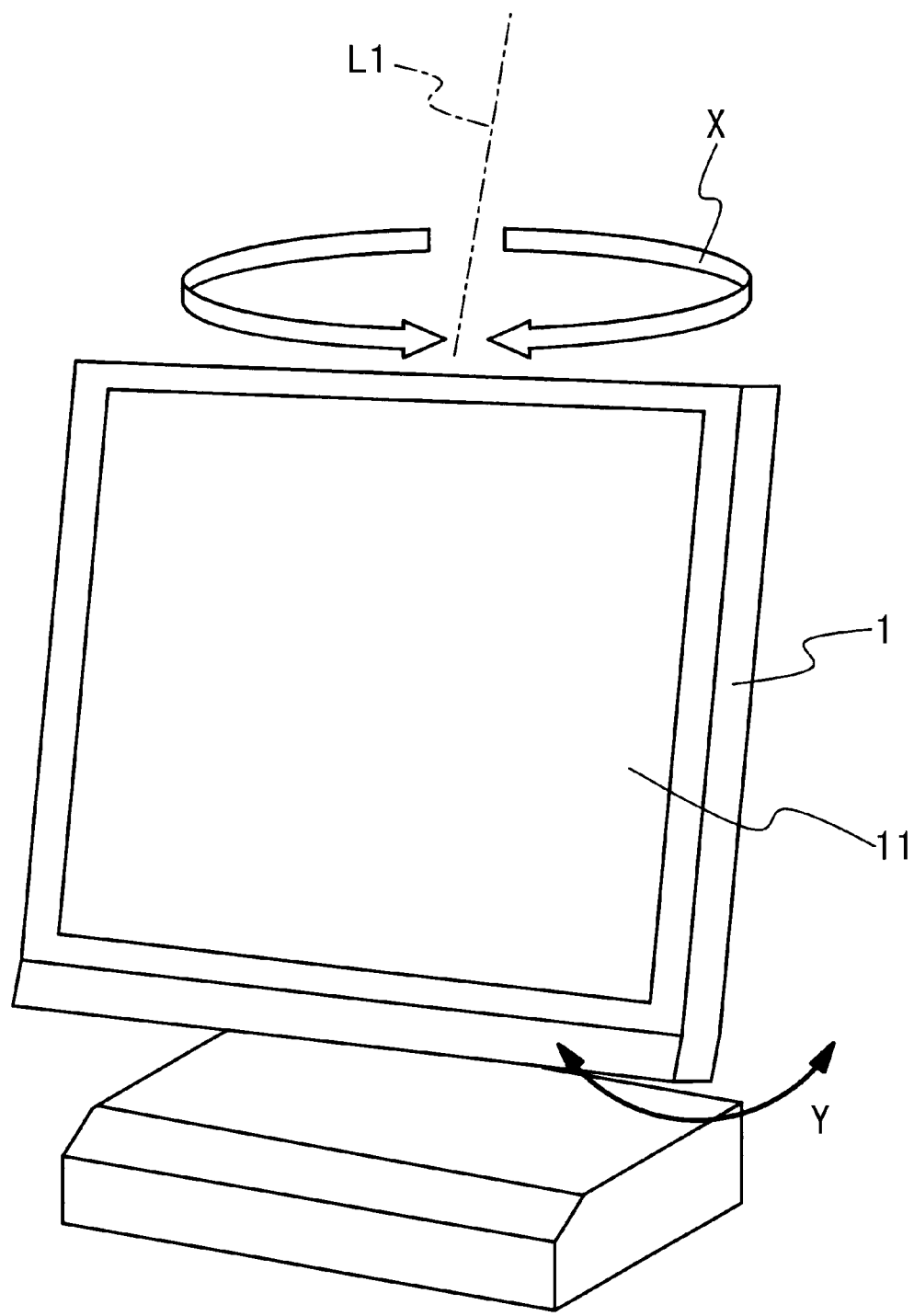
FIG. 2 is a perspective view of the electronic apparatus shown in FIG. 1.
Figure 3:
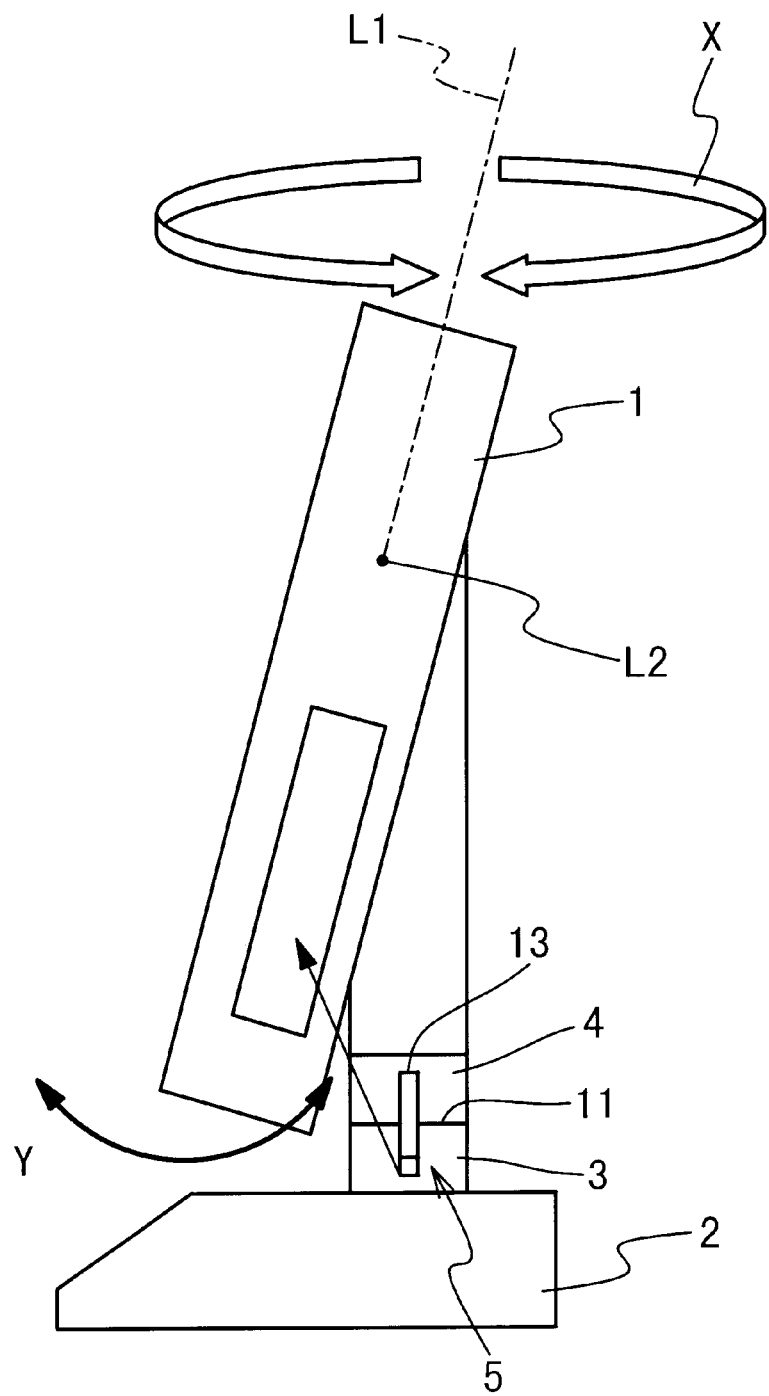
FIG. 3 is a side view of the electronic apparatus shown in FIG. 1.

Once the lock mechanism 5 has been unlocked, the main body 1 can be rotated clockwise and counterclockwise directions X around the first axis Li of the body-side shaft 4 as is illustrated in FIG. 2. In addition, the main body 1 can be rotated in the direction Y around the second axis L2 as is illustrated in FIG. 3. The main body 1 can therefore rotate in a horizontal plane and a vertical plane. The second axis L2 intersects with the first axis L1 at right angles.

Unless the user intentionally unlocks the lock mechanism 5, the main body 1 cannot move with respect to the base 2.

The lock mechanism 5 includes a lock arm 6 and a lock groove 7. The lock arm 6 is connected to the base-side shaft 3 and can rotate. The lock groove 7 is cut in the body-side shaft 4. The lock arm 6 has a proximal end 8 as a second engagement section having a control unit, which is coupled to the base-side shaft 3. The lock arm 6 has an engaging end 9 as a first engagement section, which can fit into the lock groove 7 to lock the body-side shaft 4 to the base-side shaft 3. To unlock the lock mechanism 5, the user rotates the lock arm 6 around the proximal end 8 that acts as a fulcrum, as is indicated by the broken lines in FIG. 1. The engaging end 9 of the arm 6 is thereby pulled out of the lock groove 7.

The main body 1 includes an LCD 11 as a display unit and incorporates an HDD (Hard Disk Drive) 12 as a magnetic disk drive. The HDD 12 includes a recording medium 13, a magnetic head 14, a CPU 15 as a safety unit, a spindle motor 16, and a save zone (shipping zone) 17 as a save position. The magnetic head 14 can write and read data on and from the recording medium 13. The CPU 15 controls the motion of the magnetic head 14. The spindle motor 16 is provided to move the magnetic head 14. The magnetic head 14 can be moved from any position over the medium 13 into the save zone 17.

Figure 4:
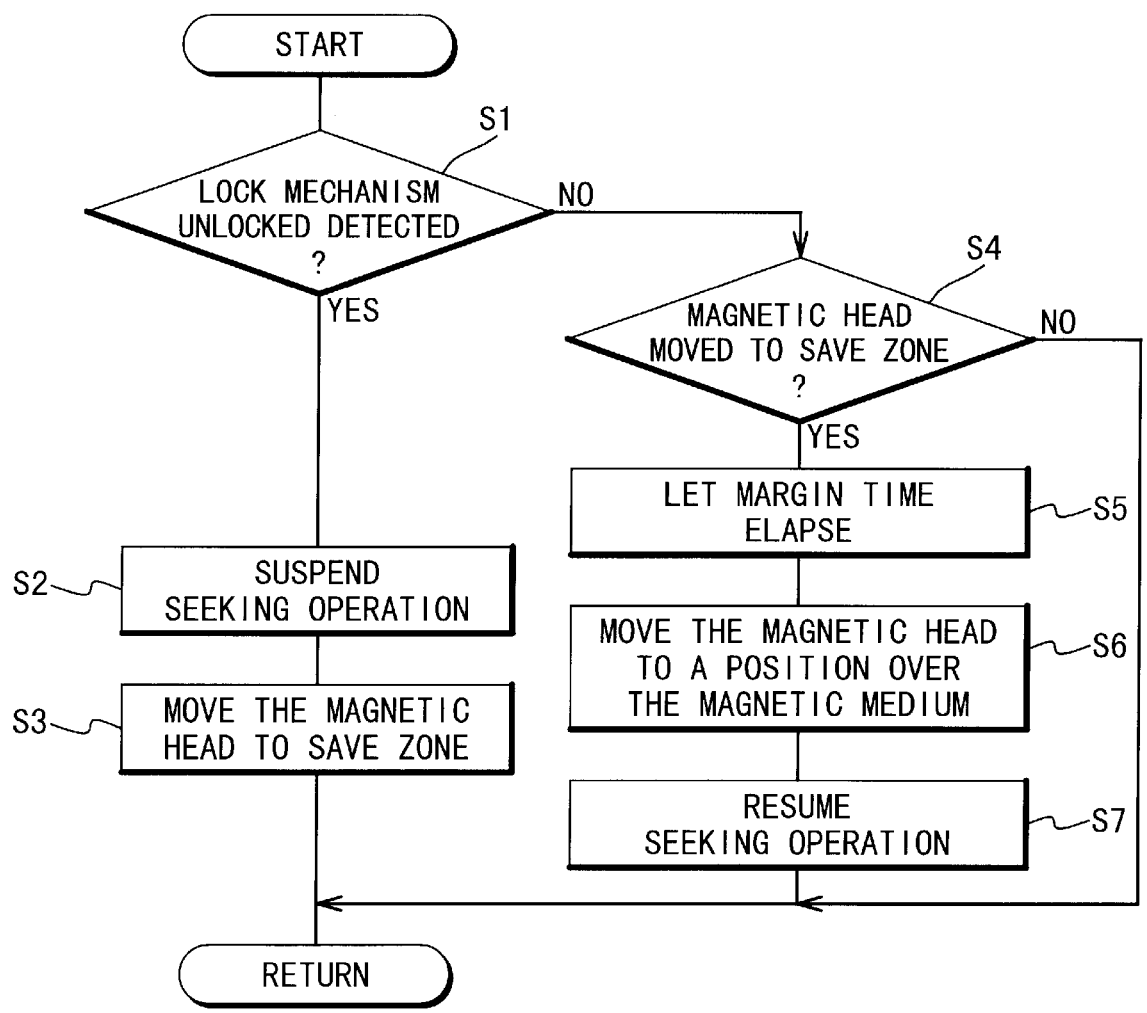
FIG. 4 is a flowchart explaining a method of protecting a movable section, according to the present invention.

FIG. 4 is a flowchart that explains a method of protecting a movable section of an electronic apparatus, according to the present invention. The user of the computer may rotate the main body 1 in the directions X and Y while using the computer. In this case, the HDD 12 incorporated in the main body 1 is moved and vibrated at the same time. The magnetic head 14 may come into physical contact with the recording medium 13, possibly destroying the recording medium 13. Nonetheless, the recording medium 13 would not be destroyed. The user cannot rotate the main body 1 unless the user rotates the lock arm 6 around the proximal end 8 thereof, thus pulling the engaging end 9 of the arm 6 from the lock groove 7 cut in the body-side shaft 4.

When the user unlocks the lock mechanism 5, a sensor, as a control unit, provided at the proximal end 8 detects this fact and generates a first control signal 18 (Step S1). The first control signal 18 is supplied to the CPU 15 incorporated in the HDD 12. Upon receipt of the first control signal 18, the CPU 15 suspends the seeking operation of the magnetic head 14 by supplying a first safety signal 19 to the spindle motor 16 (Step S2). The CPU 15 then causes the spindle motor 16 to move the magnetic head 14 from a position over the medium 13 into the shipping zone 17 (Step S3). The data being written on, or read from, the medium 13 at this time is temporarily saved.

When the user locks the main body 1 to the base 2, the sensor at the proximal end 8 stops generating the first control signal 18. It means that the CPU 15 receives a second control signal 18' which is an off-signal of the first control signal 18 (Step S1). Then, it is determined whether the magnetic head 14 lies in the shipping zone 17 (Step S4). If YES in Step S4, the CPU 15 does nothing until a predetermined time passes (Step S5). Upon lapse of the predetermined time, the CPU 15 drives the spindle motor 16, moving the magnetic head 14 from the shipping zone 17 back to the position over the recording medium 13 by supplying a second safety signal 19' to the spindle motor 16 (Step S6). The CPU 15 then resumes the seeking operation of the magnetic head 14 (Step S7). The magnetic head 14 writes the data, which is temporarily saved, on the recording medium 13, or stores this data into a data-storage device.

If NO in Step S4, the process returns to Step S1. That is, if the LCD 11 is not operated and the magnetic head 14 does not lie in the shipping zone 17, the process repeats itself.

Figure 5:
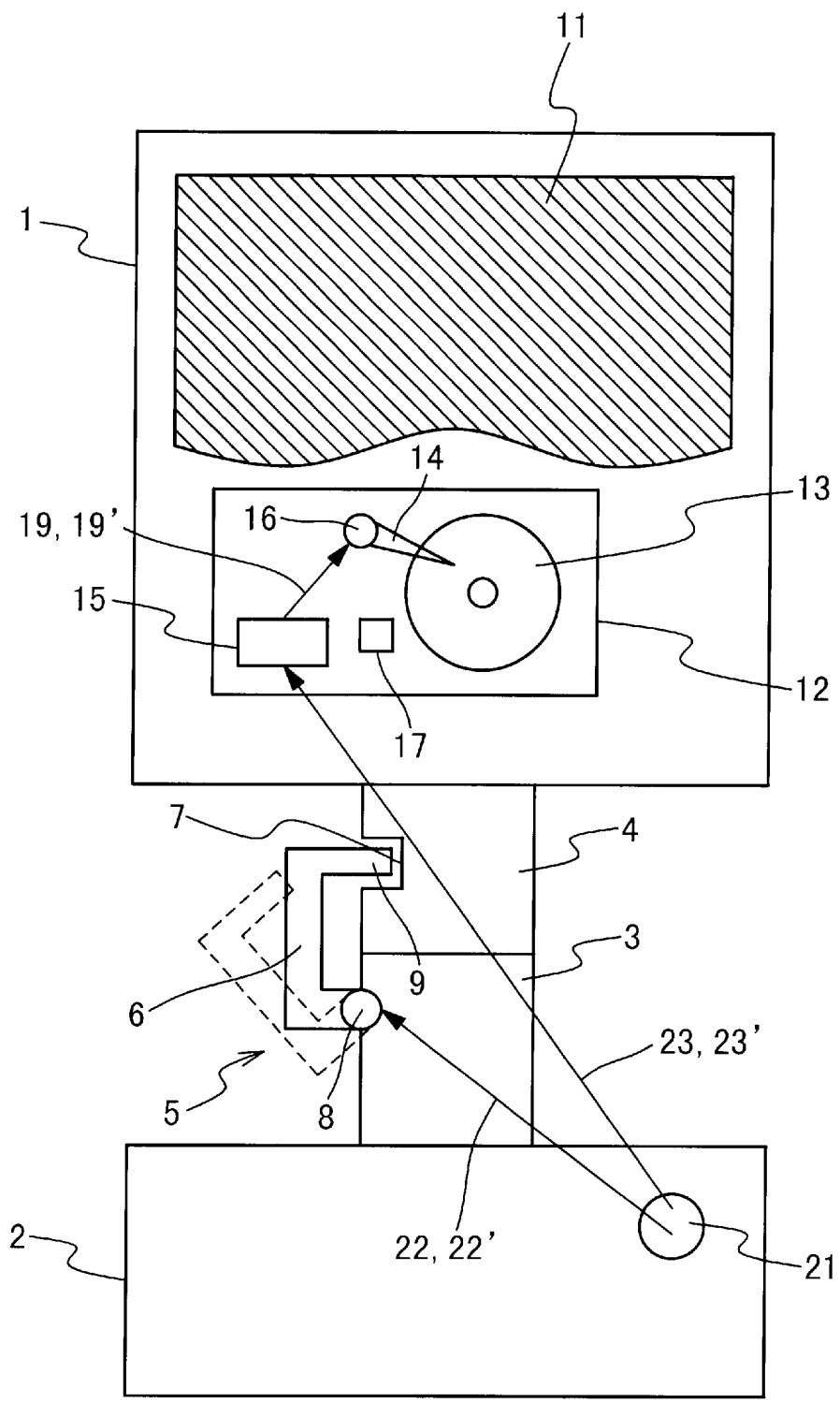
FIG. 5 is a sectional view of an electronic apparatus incorporating a protection apparatus according to a second embodiment of the present invention, which is configured to protect a movable section of the electronic apparatus.

FIG. 5 shows an electronic apparatus that is the second embodiment of the present invention. The second embodiment differs from the first embodiment in that an electric motor drives the proximal end 8 of the lock arm 6. A lock-unlocking switch 21 is provided on the base 2. When the user pushes the lock-unlocking switch 21, a second unlock signal 22 is generated and actuates the electric motor. The electric motor rotates the lock arm 6 to the position indicated by the broken lines (FIG. 5), unlocking the lock mechanism 5.

After the lock mechanism 5 is thus unlocked, the user may push the switch 21 to stop generating the second unlock signal 22. It means that the electric motor receives a second lock signal 22' which is an off-signal of the second unlock signal 22. Then, the electric motor rotates the lock arm 6 in the opposite direction, pushing the engaging end 9 of the arm 6 into the lock groove 7.

When the lock-unlocking switch 21 is pushed, a first unlock signal 23 generated is supplied to the CPU 15 of the HDD 12 at the same time of supplying the second unlock signal 22. Upon receipt of the first unlock signal 23, the CPU 15 suspends the seeking operation of the magnetic head 14. The CPU 15 then causes the spindle motor 16 to move the magnetic head 14 from a position over the medium 13 into the shipping zone 17. When the lock arm 6 is set into the lock position again, the lock-unlocking switch 21 stops supplying the first unlock signal 23. It means that the CPU 15 receives a first lock signal 23' which is an off-signal of the first unlock signal 23. Hence, the CPU 15 does nothing until a predetermined time passes. Upon lapse of the predetermined time, the CPU 15 drives the spindle motor 16, moving the magnetic head 14 from the shipping zone 17 back to the position over the recording medium 13. The CPU 15 then resumes the seeking operation of the magnetic head 14. Data can therefore be written or read in the HDD 12. As long as the lock arm 6 has its engaging end 9 fitted in the lock groove 7, the main body 1 remains locked mechanically or electrically and cannot rotate around the second axis L2, either.

The motor is driven to lock or unlock the first engagement section to or from the main body, when the user operates the switch 21. Thus, unless the user operates the switch 21, the main body 1 will not be locked to, or unlocked from, the base 2.

The first unlock signal 23 and the second unlock signal 22 are on-signals, while the first lock signal 23' and the second lock signal 22' are off-signals. The second unlock signal 22 can unlock the main body 1 from the base 2. The first unlock signal 23 and the second unlock signal 22 automatically generated are generated by operating the same switch 21, when the main body 1 is unlocked.

Unless the lock mechanism 5 is unlocked, the user cannot move the main body 1 at all. When the user moves the main body 1 after the lock mechanism 5 has been unlocked to make it possible to move the main body 1, the magnetic head 14 has already moved from the recording medium 13 to the save zone 17. Hence, the magnetic head 14 is prevented from contacting the recording medium 13 when the main body 1 is moved. This prevents damages to the recording medium 13. The user can therefore move the main body 1, without worrying about any possible troubles.

In the case of a computer main body which has a liquid crystal display (i.e., a thin component) and which incorporates a magnetic disk drive, the motion of the main body may greatly vibrate the magnetic head with respect to the magnetic recording medium, or vice versa, depending on the positional relation between the head and the medium. The present invention effectively works, particularly in such computers.

The electronic apparatus with an apparatus for protecting a movable section of the electronic apparatus and method for protecting a movable section, both according to the present invention, enable the user of the electronic apparatus, including a TV, DVD and video player with HDD and so on, to move the main body of the electronic apparatus, without the risk of causing troubles. The invention therefore makes it possible to incorporate an HDD into the movable section. Particularly, a magnetic disk drive can be incorporated into the movable section of a computer, which includes a thin display, regardless of the design layout the computer.

What is claimed is:

1. An electronic apparatus comprising:
   a base;
   a main body rotatably supported on said base; and
   a lock mechanism that prevents said main body from rotating with respect to said base,
   wherein said main body comprises:
      a magnetic disk drive,
   wherein said magnetic disk drive comprises:
      a magnetic head which accesses a recording medium; and
      a safety unit that moves said magnetic head to a save position where said magnetic head is safe in said magnetic disk drive, when said lock mechanism is unlocked.

2. The electronic apparatus according to claim 1 wherein said safety unit moves said magnetic head to start a seeking operation over said recording medium, when said lock mechanism is locked.

3. The electronic apparatus according to claim 2 wherein said main body further comprises a display unit.

4. The electronic apparatus according to claim 2 wherein said lock mechanism comprises:
   a control unit which supplies a first control signal showing that said lock mechanism is unlocked to said safety unit,
   wherein said safety unit supplies a first safety signal to move said magnetic head to said save position.

5. The electronic apparatus according to claim 4 wherein said control unit supplies a second control signal showing that said lock mechanism is locked to said safety unit, and said safety unit supplies a second safety signal (19') to move said magnetic head to start a seeking operation over said recording medium.

6. The electronic apparatus according to claim 1 wherein said lock mechanism is manually operable.

7. The electronic apparatus according to claim 2 wherein said lock mechanism further comprises:
   a first engagement section coupled to said main body; and
   a second engagement section coupled to said base,
   wherein said base comprises:
      a switch that is manually operable wherein said switch outputs a first unlock signal to said safety unit to move said magnetic head to said save position, and outputs a second unlock signal to unlock said first engagement section or said second engagement section from said main body or said base, when said lock mechanism is unlocked.

8. The electronic apparatus according to claim 7 wherein said switch outputs a first lock signal to said safety unit to move said magnetic head to start a seeking operation over said recording medium, and outputs a second lock signal (22') to lock said first engagement section or said second engagement section to said main body or said base, when said lock mechanism is locked.

9. The electronic apparatus according to claim 8 wherein said first lock signal and said second lock signal (22') are off-signals.

10. A method of protecting a moveable section of an electronic apparatus, comprising the steps of:
(a) detecting whether or not a main body is unlocked from a base of an electronic apparatus which comprises:
said base; and
said main body movable with respect to said base,
wherein said main body includes:
a display unit; and
a magnetic disk drive,
wherein said magnetic disk drive includes:
a magnetic head; and
a recording medium (S1);
(b) suspending a seeking operation of said magnetic head over said recording medium, when said main body is unlocked from said base (S2); and
(c) moving said magnetic head to a save position where said magnetic head is safe in said magnetic disk drive (S3).

11. The method of protecting a moveable section of an electronic apparatus according to claim 10, wherein said (a) detecting step comprises the steps of:
(d) generating automatically a first control signal when said main body is unlocked from said base; and
(e) sending said first control signal to said magnetic disk drive,
wherein said (b) suspending step suspends said seeking operation based on said first control signal.

12. The method of protecting a movable section of an electronic apparatus according to claim 10, further comprises the steps of:
(f) detecting whether or not said magnetic head lies in said save postion, when said main body is locked to said base (S4);
(g) moving said magnetic head over said recording medium when said magnetic head lies in said save position (S6); and
(h) starting a seeking operation of said magnetic head (S7).

13. The method of protecting a movable section of an electronic apparatus according to claim 12, wherein said (f) detecting step comprises the steps of:
(i) generating automatically a second control signal when said main body is locked to said base; and
(j) sending said second control signal to said magnetic disk drive,
wherein said (g) moving step moves said magnetic head over said recording medium based on said second control signal.

14. The method of protecting a movable section of an electronic apparatus according to claim 10, wherein said (a) detecting step comprises the steps of:
(k) generating automatically an unlock signal when said main body is unlocked from said base by turning on a switch; and
(l) sending said unlock signal to said magnetic disk drive,
wherein said (b) suspending step suspends said seeking operation based on said unlock signal, and said base comprises said switch.

15. The method of protecting a movable section of an electronic apparatus according to claim 12, wherein said (f) detecting step comprises the steps of:
(m) generating automatically an unlock signal when said main body is locked to said base by turning off said switch; and
(n) sending said unlock signal to said magnetic disk drive, wherein said (g) moving step moves said magnetic head over said recording medium based on said unlock signal.

16. The method of protecting a movable section of an electronic apparatus according to claim 12, wherein said (g) moving step comprises the step of:
(o) letting a predetermined time elapse after said main body is locked to said base.

* * * * *